(12) United States Patent
Vedula et al.

(10) Patent No.: US 10,506,071 B2
(45) Date of Patent: Dec. 10, 2019

(54) METHOD AND APPARATUS FOR PLAYING MULTIMEDIA CONTENTS IN A COMMUNICATION

(71) Applicant: Samsung Electronics Co., Ltd., Gyeonggi-do (KR)

(72) Inventors: Kiran Bharadwaj Vedula, Bangalore (IN); In-Young Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 202 days.

(21) Appl. No.: 14/635,511

(22) Filed: Mar. 2, 2015

(65) Prior Publication Data

US 2015/0249698 A1 Sep. 3, 2015

Related U.S. Application Data

(60) Provisional application No. 61/946,141, filed on Feb. 28, 2014.

(51) Int. Cl.
*H04L 29/08* (2006.01)
*H04L 29/06* (2006.01)
(Continued)

(52) U.S. Cl.
CPC .......... *H04L 67/32* (2013.01); *H04L 65/4084* (2013.01); *H04L 65/4092* (2013.01); *H04L 65/602* (2013.01); *H04L 65/608* (2013.01); *H04N 21/4122* (2013.01); *H04N 21/41407* (2013.01); *H04N 21/43637* (2013.01); *H04N 21/44004* (2013.01); *H04N 21/8455* (2013.01)

(58) Field of Classification Search
USPC ........................................................ 709/223
See application file for complete search history.

(56) References Cited

U.S. PATENT DOCUMENTS 5,983,236 A * 11/1999 Yager ................ G06F 17/30017
9,065,876 B2 * 6/2015 Huang ................ H04L 65/4092
(Continued)

FOREIGN PATENT DOCUMENTS

CN 1937778 3/2007
EP 1816864 8/2007
(Continued)

OTHER PUBLICATIONS

International Search Report dated May 18, 2015 issued in counterpart application No. PCT/KR2015/001982.
(Continued)

*Primary Examiner* — Umar Cheema
*Assistant Examiner* — John Fan
(74) *Attorney, Agent, or Firm* — The Farrell Law Firm, P.C.

(57) ABSTRACT

Provided is a method for playing multimedia contents in a first device of a communication system, the method including receiving a buffer storage capability of a second device from the second device, upon receiving a User Backward Seek (UIBC) command from the second device, determining a play position from which multimedia contents are to be played according to the UIBC command in a buffer of the second device based on the buffer storage capability of the second device, and notifying the second device of information about the determined play position.

10 Claims, 6 Drawing Sheets

(51) Int. Cl.
*H04N 21/41* (2011.01)
*H04N 21/414* (2011.01)
*H04N 21/4363* (2011.01)
*H04N 21/44* (2011.01)
*H04N 21/845* (2011.01)

(56) References Cited

U.S. PATENT DOCUMENTS

| | | | |
|---|---|---|---|
| 2005/0021830 A1* | 1/2005 | Urzaiz | H04L 47/10 |
| | | | 709/234 |
| 2011/0078324 A1 | 3/2011 | Honma et al. | |
| 2011/0153858 A1 | 6/2011 | Bae et al. | |
| 2013/0009887 A1 | 1/2013 | Huang et al. | |
| 2013/0179605 A1* | 7/2013 | Huang | H04L 65/4092 |
| | | | 710/20 |
| 2013/0195119 A1* | 8/2013 | Huang | H04L 65/4092 |
| | | | 370/468 |
| 2013/0222210 A1 | 8/2013 | Wang et al. | |
| 2013/0304794 A1 | 11/2013 | Verma et al. | |
| 2014/0009394 A1* | 1/2014 | Lee | H04N 5/4403 |
| | | | 345/157 |
| 2014/0210693 A1* | 7/2014 | Bhamidipati | H04L 65/4092 |
| | | | 345/2.3 |
| 2015/0172757 A1* | 6/2015 | Kafle | H04L 67/1044 |
| | | | 725/81 |
| 2016/0150177 A1 | 5/2016 | Minemura | |

FOREIGN PATENT DOCUMENTS

| | | |
|---|---|---|
| EP | 2 120 459 | 11/2009 |
| JP | 07-193788 | 7/1995 |
| JP | 2007-080161 | 3/2007 |
| JP | 2013-045273 | 3/2013 |
| JP | 2015-501579 | 1/2015 |
| JP | 2015-511788 | 4/2015 |
| KR | 1020100028156 | 3/2010 |
| KR | 1020130133600 | 12/2013 |
| WO | WO 2013/168933 | 11/2013 |
| WO | WO 2015/056296 | 4/2015 |

OTHER PUBLICATIONS

Chinese Office Action dated Jul. 5, 2018 issued in counterpart application No. 201580011134.6, 22 pages.
Japanese Office Action dated Dec. 21, 2018 issued in counterpart application No. 2016-554408, 6 pages.

* cited by examiner

METHOD AND APPARATUS FOR PLAYING MULTIMEDIA CONTENTS IN A COMMUNICATION

PRIORITY

This application claims the benefit under 35 U.S.C. § 119(e) of a patent application filed in the United States Patent and Trademark Office on Feb. 28, 2014 and assigned Ser. No. 61/946,141, the contents of which are incorporated herein by reference.

TECHNICAL FIELD

The present disclosure relates to a method and apparatus for playing multimedia contents according to a user's control command in a communication system.

BACKGROUND

Recently, portable devices have provided various functions needed by users, such as a call function, an image or video capturing function, a broadcasting reception function, an Internet connection function, and so forth.

Meanwhile, recent portable devices (hereinafter, referred to as source devices) provide a wireless image transmission function capable of transmitting multimedia contents (that is, video, audio, texts, and the like) to other devices (hereinafter, referred to as sink devices) through wireless communication (for example, Wireless Fidelity (Wi-Fi), Bluetooth, a mobile communication network, or the like). Examples of the wireless image transmission function may include Wi-Fi Display (WFD), Wireless Display (Wi-Di), Miracast, and so forth.

The wireless image transmission function generally transmits multimedia contents on a real-time basis. As such, when transmitting the multimedia contents to the sink device on a real time basis, the source device stores data by a predetermined size (or time) in a buffer and then plays data to avoid fluctuation characteristics of a wireless communication channel and to provide a continuous screen.

Herein, if the sink device receives a control command for controlling a play position of the source device from a user, the source device checks the play position corresponding to the control command and seeks again multimedia contents from the checked play position. The source device transcodes a screen of the source device and retransmits the multimedia contents from the checked play position even though the same multimedia contents have already been transmitted to the sink device. Therefore, a need exists for a scheme for effectively retransmitting multimedia contents from the source device to the sink device.

SUMMARY

An aspect of the present disclosure is to address at least the above-mentioned problems and/or disadvantages and to provide at least the advantages described below. Accordingly, an aspect of the present disclosure is to provide a method and apparatus for playing multimedia contents according to a user's control command in a communication system.

Another aspect of the present disclosure is to provide a method and apparatus for playing multimedia contents by using a buffer of a sink device in a communication system.

In accordance with an aspect of the present disclosure, there is provided a method for playing multimedia contents in a first device of a communication system, the method including receiving a buffer storage capability of a second device from the second device, upon receiving a User Backward Seek (UIBC) command from the second device, determining a play position from which multimedia contents are to be played according to the UIBC command in a buffer of the second device based on the buffer storage capability of the second device, and notifying the second device of information about the determined play position.

In accordance with another aspect of the present disclosure, there is provided a method for playing multimedia contents in a second device of a communication system, the method including transmitting a buffer storage capability of the second device to a first device, transmitting a User Backward Seek (UIBC) command to the first device upon input of the UIBC command through an input unit, receiving information about a play position from which multimedia contents are to be played in a buffer of the second device from the first device, the play position being determined based on the buffer storage capability of the second device, and playing the multimedia contents stored in the buffer based on the information about the play position.

In accordance with another aspect of the present disclosure, there is provided an apparatus for playing multimedia contents in a first device of a communication system, the apparatus including a communication unit configured to receive a buffer storage capability of a second device from the second device and a controller configured to, upon receiving a User Backward Seek (UIBC) command from the second device, determine a play position from which multimedia contents are to be played according to the UIBC command in a buffer of the second device based on the buffer storage capability of the second device and to notify the second device of information about the determined play position.

In accordance with another aspect of the present disclosure, there is provided an apparatus for playing multimedia contents in a second device of a communication system, the apparatus including a communication unit configured to transmit a buffer storage capability of the second device to a first device, to transmit a User Backward Seek (UIBC) command to the first device upon input of the UIBC command through an input unit, and to receive information about a play position from which multimedia contents are to be played in a buffer of the second device from the first device, the play position being determined based on the buffer storage capability of the second device and a controller configured to play the multimedia contents stored in the buffer based on the information about the play position.

BRIEF DESCRIPTION OF THE DRAWINGS

The above and other aspects, features and advantages of certain exemplary embodiments of the present disclosure will be more apparent from the following description taken in conjunction with the accompanying drawings, in which.

DETAILED DESCRIPTION

Hereinafter, exemplary embodiments of the present disclosure will be described in detail with reference to the accompanying drawings. In the following description, only parts necessary for understanding of operations according to the present disclosure will be described, and a description of other parts will not be provided not to obscure the subject matter of the present disclosure.

The subject matter of the present disclosure provides a method for playing multimedia contents by using a buffer of a sink device if the sink device receives a control command from a user.

To this end, a detailed description will be made of a method and apparatus for playing multimedia contents in a communication system according to an embodiment of the present disclosure.

Figure 1:
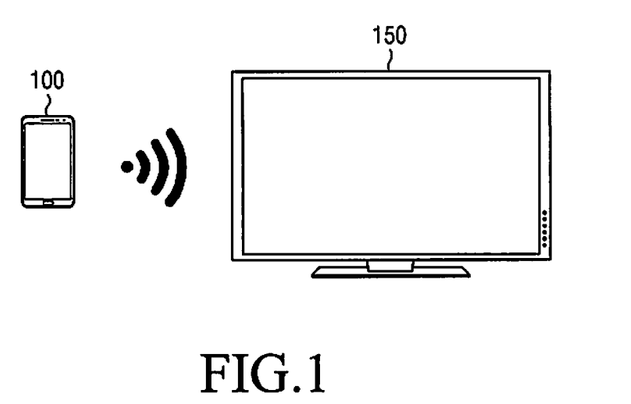
FIG. 1 schematically illustrates a communication system according to an embodiment of the present disclosure.

FIG. 1 schematically illustrates a communication system according to an embodiment of the present disclosure.

Referring to FIG. 1, a communication system according to an embodiment of the present disclosure may include a source device 100 and a sink device 150. The source device 100 may be a portable device having a relatively small screen, such as a mobile communication device, a smartphone, a tablet Personal Computer (PC), a Portable Multimedia Player (PMP), a Personal Digital Assistant (PDA), or the like. The sink device 150 may be an electronic device having a relatively large screen such as a desktop PC, a laptop computer, a smart Television (TV), or the like.

The source device 100 forms a communication channel for wirelessly transmitting multimedia contents with the sink device 150. For example, the communication channel may include a Miracast session. More specifically, the source device 100 transmits multimedia contents and a control command to the sink device 150 through the communication channel. The communication channel may use a communication channel based on a Transmission Control Protocol (TCP) or a User Datagram Protocol (UDP).

In particular, if WFD is provided between the source device 100 and the sink device 150 in the communication system according to an embodiment of the present disclosure, a streaming protocol between the source device 100 and the sink device 150 is defined in a forward channel.

That is, the source device 100 may transmit multimedia contents and a control command to the sink device 150 on a real-time basis, upon being connected with the sink device 150 through the communication channel. More specifically, the source device 100 converts the multimedia contents into a stream form and transmits the multimedia contents converted into the stream form to the sink device 150 through the communication channel. The source device 100 transmits the control command to the sink device 150 through the communication channel. The control command is a command for controlling playback of the multimedia contents. For example, the control command may include Volume Control, Pause, Resume, Stop, Rewind, and the like.

The sink device 150 receives the multimedia contents converted into the stream form from the source device 100 through the communication channel, and inversely converts and plays the received multimedia contents. The sink device 150 receives the control command from the source device 100 and performs a function corresponding to the control command.

In particular, the sink device 150 according to an embodiment of the present disclosure may receive the control command from a user in a backward channel. Herein, the control command received from the user through the sink device 150 in the backward channel is referred to as a User Backward Seek (UIBC) command. That is, once the UIBC command is input from the user, the sink device 150 transmits the UIBC command to the source device 100. For example, the UIBC command is assumed to be a control command for rewinding a play position of the multimedia contents. The UIBC command is collected by a mouse down or a touch by the user through a display window of the sink device 150.

Upon receiving the UIBC command from the sink device 150, the source device 100 controls the sink device 150 to resume playback of the multimedia contents from a play position corresponding to the UIBC command by using a position determination algorithm according to an embodiment of the present disclosure. The position determining algorithm will be described with reference to FIGS. 3 and 4.

Figure 2:
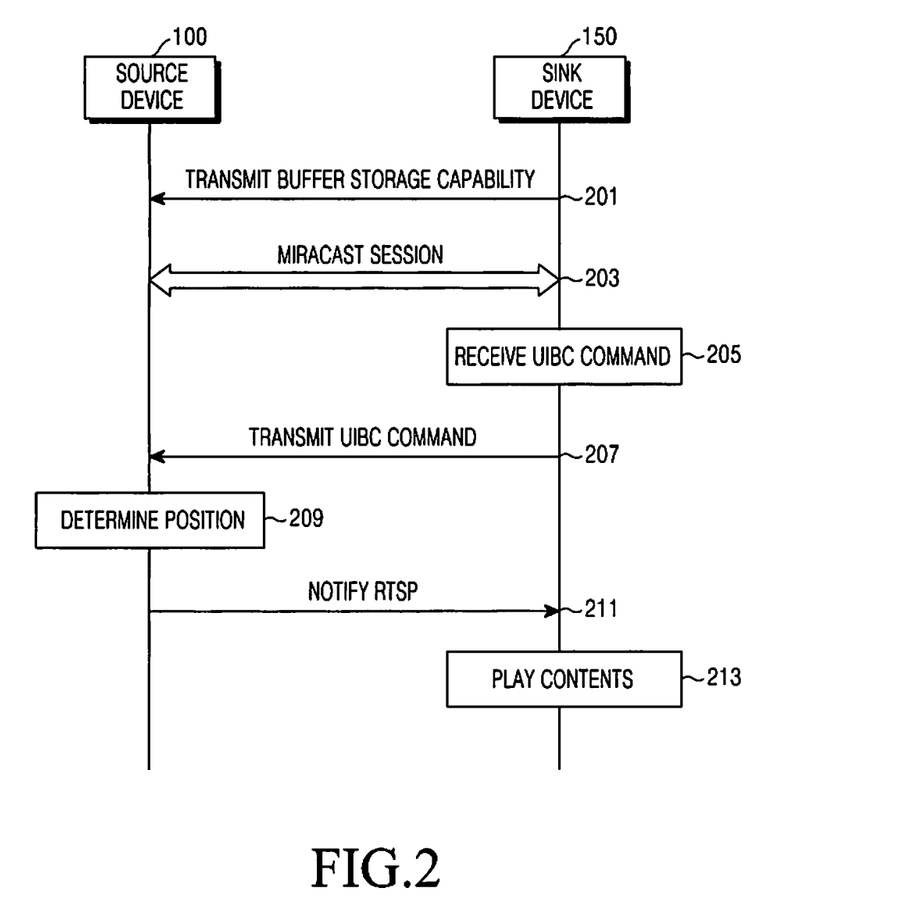
FIG. 2 is a diagram illustrating a method for playing multimedia contents between a sink device and a source device in a communication system according to an embodiment of the present disclosure.

FIG. 2 is a diagram illustrating a method for playing multimedia contents between a sink device and a source device in a communication system according to an embodiment of the present disclosure.

Referring to FIG. 2, the sink device 150 transmits a buffer storage capability to the source device 100 in operation 201. In a communication environment 150 where a Miracast session is formed between the source device 100 and the sink device 150, upon receiving a UIBC command from the user in operation 205, the sink device 150 transmits the received UIBC command to the source device 100 in operation 207. Then, the source device 100 determines a play position of the multimedia contents according to the UIBC command based on the position determining algorithm according to an embodiment of the present disclosure in operation 209. The source device 100 determines at least one of a play position from which the multimedia contents are to be played in the source device 100 and a play position from which the multimedia contents are to be played in the sink device 150, based on the buffer storage capability of the sink device 150.

The source device 100 then notifies the sink device 150 of information about the play position from which the multimedia contents are to be played in the sink device 150 in operation 211. The information about the play position from which the multimedia contents are to be played may be notified to the sink device 150 using a Real-Time Streaming Protocol (RTSP). The information about the play position from which the multimedia contents are to be played in the sink device 150 includes at least one of the position (that is, a point in time) at which the multimedia contents are to be played, a Packetized Elementary Stream (PES) number, memory size information, time information, and the amount of contents stored in a buffer of the sink device 150.

Upon receiving the information about the play position from which the multimedia contents are to be played through the RTSP notification, the sink device 150 plays the multimedia contents with at least one of the multimedia contents transmitted from the source device 100 and the multimedia contents stored in the buffer, based on the information about the play position from which the received multimedia contents are to be played, in operation 213.

The method for determining a play position from which multimedia contents are to be played according to the UIBC command based on the position determining algorithm in the source device 100 according to an embodiment of the present disclosure is as described below.

The source device 100 checks the UIBC command to calculate a data size of the multimedia contents to be retransmitted, by using a difference between the last position of the played multimedia contents and a position of the multimedia contents corresponding to the UIBC command. Herein, the source device 100 calculates the data size based on previously negotiated parameters such as codecs. If the buffer storage capability received from the sink device 150 (that is, a buffer size of the sink device 150) is greater that the calculated data size (that is, the buffer size of the sink device 150>the calculated data size), the source device 100 notifies the sink device 150 of information indicating that the multimedia contents are not to be transmitted up to a time at which a position (t) corresponding to the UIBC command reaches an old position (that is, the last position of the played multimedia contents).

On the other hand, if the buffer size of the sink device 150 is smaller than the calculated data size (that is, the buffer size of the sink device 150<the calculated data size), the source device 100 notifies the sink device 150 of information indicating that the multimedia contents are to be transmitted, up to a time at which the position (t) corresponding to the UIBC command is the same as {the calculated data size−the buffer size of the sink device 150+X}. Herein, X denotes a threshold value previously determined for smooth transition of a target for receiving the multimedia contents (that is, transition from the source device 100 to the sink device 150), and may change with a channel state. Assuming that the sink device 150 has already stored the multimedia contents in the buffer, it means that data is not to be transmitted from a time identical to {the calculated data size−the buffer size of the sink device 150+the additional X}.

Hereinafter, with reference to FIGS. 3 and 4, a description will be made of examples of a method for determining, by the source device 100, a play position of multimedia contents according to the UIBC command based on the position determining algorithm.

Figure 3:
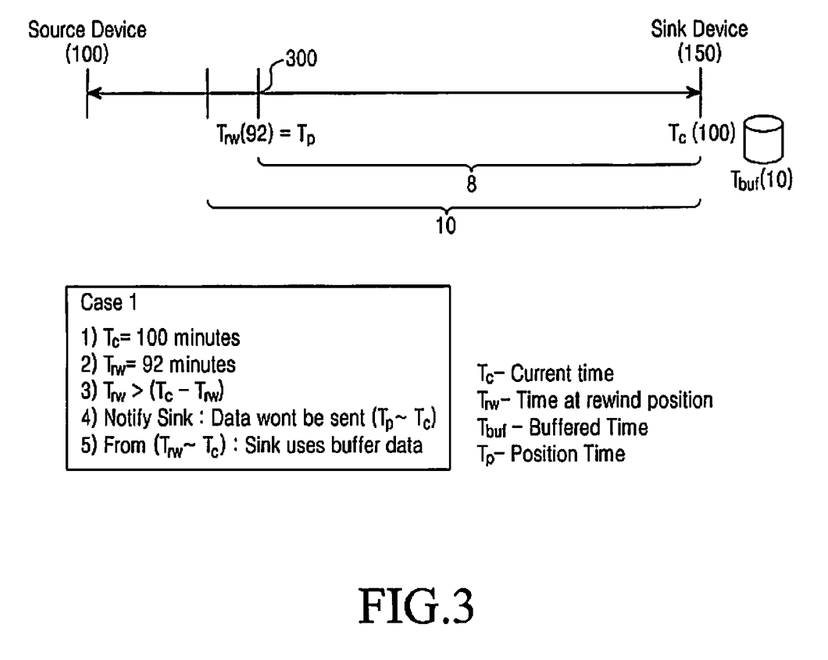
FIGS. 3 and 4 illustrate examples of a method for determining a play position from which multimedia contents are to be played in a source device 100 according to an embodiment of the present disclosure.
Figure 4:
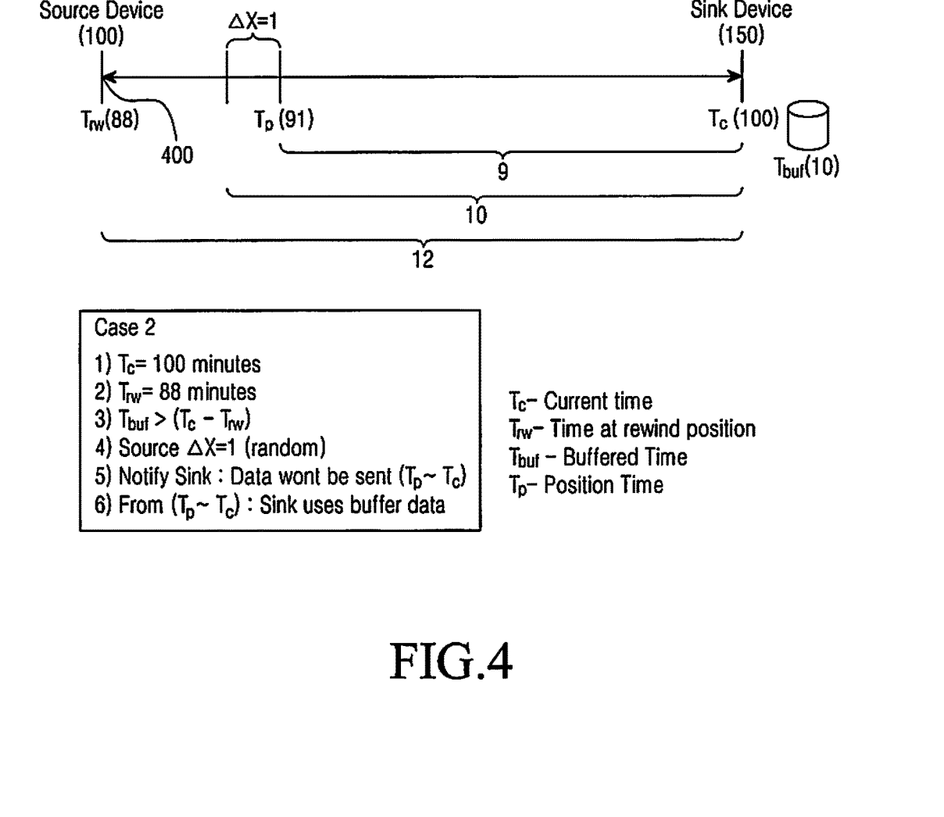

FIGS. 3 and 4 show an example of a method for determining a play position of multimedia contents in the source device 100 according to an embodiment of the present disclosure. Herein, it is assumed that a buffer size of 1 MB corresponds to 1 minute as a time for playing multimedia contents.

In the example of FIG. 3, suppose that the source device 100 receives information indicating that a buffer storage capability Tbuf is 10 MB from the sink device 150, and a position Trw corresponding to the UIBC command is indicated by reference numeral 300. Upon determining that the last position of the played multimedia contents is a point Tc corresponding to 100 minutes and the position Trw corresponding to the UIBC command is the point 300 corresponding to 92 minutes, the source device 100 determines from a difference between the point Tc and the position Trw that a data size necessary for playback of the multimedia contents is 8 MB. Then, the source device 100 notifies the sink device 150 of information indicating that the multimedia contents are not to be transmitted until Tp reaches Tc because the buffer storage capability Tbuf of 10 MB is greater than a data size, Tc−Tw, of 8 MB. The sink device 150 then plays the multimedia contents stored in the buffer from Tp to Tc according to the notification of the source device 100.

In an example of FIG. 4, it is assumed that the source device 100 receives information indicating that a buffer storage capability Tbuf is 10 MB from the sink device 150, and a position Trw corresponding to the UIBC command is indicated by reference numeral 400. Upon determining that the last position of the played multimedia contents is a point Tc corresponding to 100 minutes and the position Trw corresponding to the UIBC command is the point 400 corresponding to 88 minutes, the source device 100 determines from a difference between the point Tc and the position Trw that a data size necessary for playback of the multimedia contents is 12 MB. However, the buffer size of the sink device 150 is 10 MB, and thus the initial data of 2 MB may be removed from the position Trw corresponding to the UIBC command in the buffer. Since the buffer storage capability Tbuf of 10 MB is less than the data size, Tc−Trw, of +12 (that is, Tbuf<Tc−Trw), the source device 100 determines a point corresponding to {2 MB+X} as Tp. Herein, assuming that X is 1 in FIG. 4, Tp is determined as 91 minutes.

Thus, the source device 100 transmits multimedia contents to the sink device 150 until Trw reaches Tp, and notifies the sink device 150 of information indicating that the multimedia contents are not to be transmitted from Tp to Tc. Then, the sink device 150 receives and plays the multimedia contents from the sink device 150 from Trw to Tp according to the notification of the source device 100, and plays the multimedia contents stored in the buffer from Tp to Tc.

If the multimedia contents are played from the position corresponding to the UIBC command, the sink device 150 stores only data of X MB (1 MB in the example of FIG. 4). After the X-MB data is played, in the sink device 150, a problem occurs regarding which data is to be removed from the buffer. In this case, the data to be removed is determined by a play time corresponding to a command of the source device 150, such that the sink device 150 removes all data stored in the buffer. In this way, the buffer use efficiency of the sink device 150 is improved and re-acquisition of the same data by the sink device 150 may be optimized when the user seeks the data from a backward position.

The sink device 150 according to an embodiment of the present disclosure may share a buffer storage size or a buffer storage time with the source device 100 by transmitting the buffer storage capability. The buffer storage time is directly proportional to the buffer storage size, and as in Equation 1, may be expressed as a function among a buffer storage size, a negotiated codec, and a frame rate.

$$\text{Buffer Storage Time}=f(\text{Buffer Storage Size, Negotiated Codec, Frame Rate}) \quad (1)$$

Thus, while the embodiment of the present disclosure has been described above based on the buffer storage size, the embodiment of the present disclosure is also applicable when a shared parameter is the buffer storage time.

Figure 5:
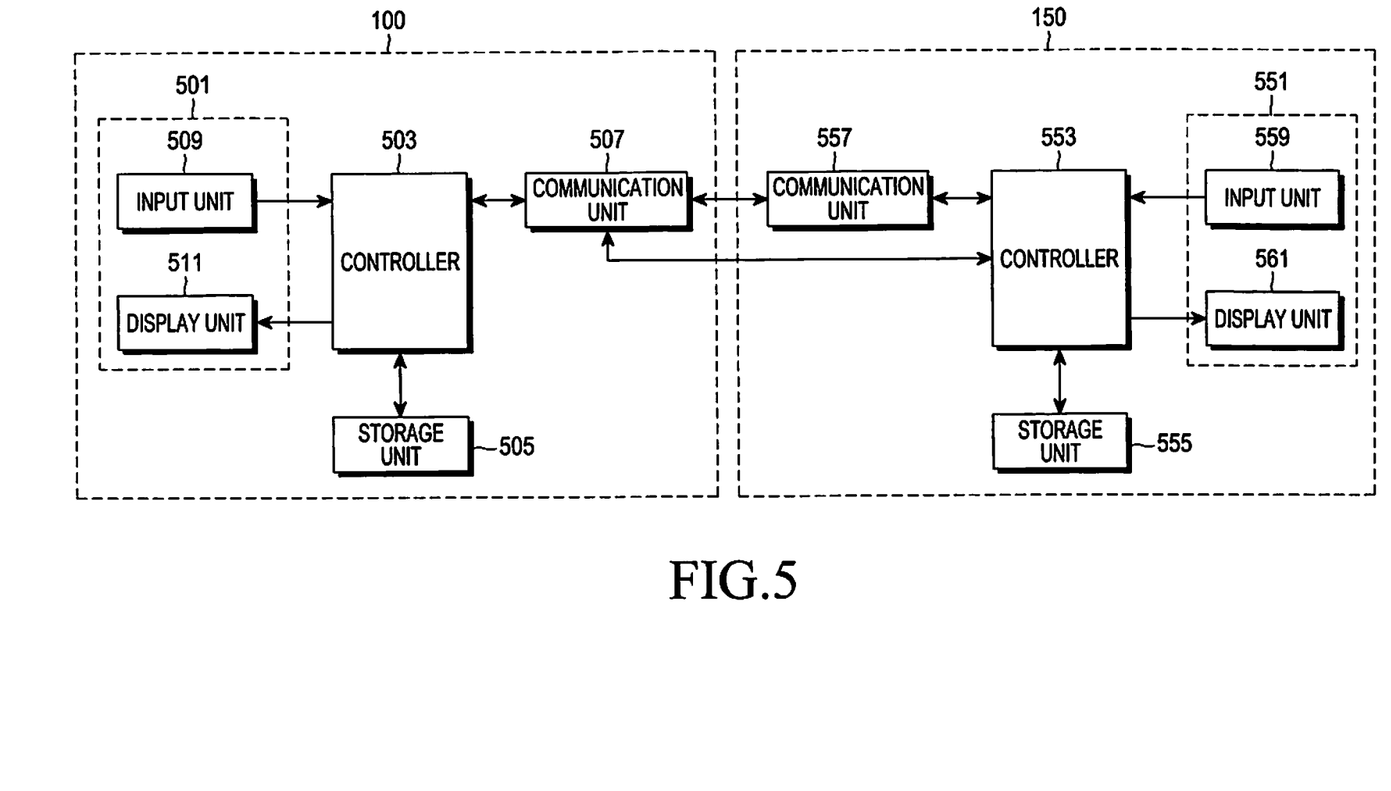
FIG. 5 is a block diagram of an apparatus for playing multimedia contents in a communication system according to an embodiment of the present disclosure.

FIG. 5 is a block diagram of an apparatus for playing multimedia contents in a communication system according to an embodiment of the present disclosure.

Referring to FIG. 5, the source device 100 may include a controller 503, a storage unit 505, a communication unit 507, an input unit 509, and a display unit 511. Herein, the input unit 509 and the display unit 511 may be configured as one unit according to a device type. The sink device 150 may include a controller 553, a storage unit 555, a communication unit 557, an input unit 559, and a display unit 561. Herein, the input unit 559 and the display unit 561 may be configured as one unit according to a device type.

The input unit 509 included in the source device 100 and the input unit 559 included in the sink device 150 may include multiple input keys and function keys for receiving number or character information and setting and controlling functions, and may be formed by any one of input means, such as a touch key, a touch pad, and a touch screen, or a combination thereof. In particular, if the input unit 559 according to an embodiment of the present disclosure receives the UIBC command for controlling the play position of multimedia contents from the user through a function key, the input unit 559 generates an event signal corresponding to the received UIBC command and delivers the generated event signal to the controller 553.

The controller 553 controls an overall operation to play multimedia contents on the display unit 561 according to the user-input UIBC command. In particular, the controller 553 transmits a buffer storage capability of a buffer included in the storage unit 555 to the source device 100 through the communication unit 557. Upon receiving an event signal from the input unit 559, the controller 553 transmits the UIBC command to the source device 100 through the communication unit 557. Upon receiving the multimedia contents from the source device 100 through the communication unit 557, the controller 553 stores the received multimedia contents in the storage unit 555. Upon receiving an RTSP notification from the source device 100 through the communication unit 557, the controller 553 plays at least one the multimedia contents received from the source device 100 and the multimedia contents stored in the storage unit 555 on the display unit 561 according to the RTSP notification.

Upon receiving the UIBC command from the sink device 150 through the communication unit 507, the controller 503 included in the source device 100 determines a play position from which the multimedia contents are to be played, according to the UIBC command based on a position determining algorithm according to an embodiment of the present disclosure. That is, the controller 503 checks the UIBC command to calculate a data size of the multimedia contents to be retransmitted, by using a difference between the last position of the played multimedia contents and a position of the multimedia contents corresponding to the UIBC command. If the received buffer storage capability (that is, the buffer size of the sink device 150) is greater than the calculated data size (that is, the buffer size of the sink device 150>the calculated data size), the controller 503 notifies the sink device 150 of information indicating that the multimedia contents are not to be transmitted up to a time at which the position t corresponding to the UIBC command reaches an old position (that is, the last position of the played multimedia contents), through the communication unit 507 by using the RTSP. In addition, the controller 503 may directly control the storage unit 55 of the sink device 150 through the communication unit 507. That is, the controller 503 directly controls the storage unit 555 to play contents previously stored in the storage unit 555 based on the determined position.

On the other hand, if the buffer size of the sink device 150 is less than the calculated data size (that is, the buffer size of the sink device 150<the calculated data size), the source device 100 notifies the sink device 150 of information indicating that the multimedia contents are to be transmitted up to a time at which the position t corresponding to the UIBC command is the same as {the calculated data size–the buffer size of the sink device 150+X} through the communication unit 507 by using the RTSP, if the buffer size of the sink device 150 is less than the calculated data size (that is, the buffer size of the sink device 150<the calculated data size).

Figure 6:
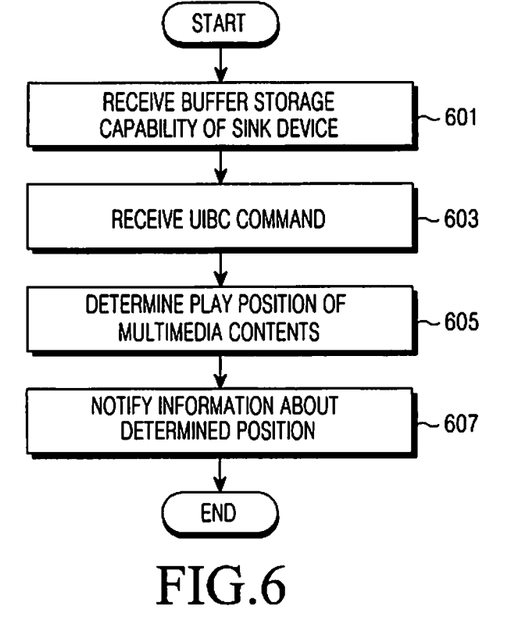
FIG. 6 is a flowchart illustrating a method for playing multimedia contents in a source device 100 of a communication system according to an embodiment of the present disclosure.

FIG. 6 is a flowchart illustrating a method for playing multimedia contents in a source device of a communication system according to an embodiment of the present disclosure.

Referring to FIG. 6, the controller 503 receives a buffer storage capability from the sink device 150 through the communication unit 507 in operation 601, and receives a UIBC command in operation 603. The controller 503 determines a play position of multimedia contents according to the UIBC command based on a position determining algorithm according to an embodiment of the present disclosure in operation 605. The controller 503 then notifies the sink device 150 of the information about the determined position through the communication unit 507.

More specifically, in operations 605 and 607, the controller 503 checks the UIBC command to calculate a data size of the multimedia contents to be retransmitted, by using a difference between the last position of the played multimedia contents and a position of the multimedia contents corresponding to the UIBC command. The controller 503 compares the buffer storage capability of the sink device 150 (that is, the buffer size of the sink device 150) with the calculated data size; if the buffer storage capability of the sink device 150 is greater than the calculated data size, the controller 503 notifies the sink device 150 of information indicating that multimedia contents are not to be transmitted up to a time at which the position t corresponding to the UIBC command reaches an old position (that is, the last position of the played multimedia contents). If the buffer storage capability of the sink device 150 is less than the calculated data size, the controller 503 calculates a time to transmit the multimedia contents in the source device 100. Herein, the time to transmit the multimedia contents in the source device 100 is calculated using {the calculated data size–the buffer size of the sink device 150+X}. The controller 503 notifies the sink device 150 of the information indicating that the multimedia contents are to be transmitted up to a time at which a time corresponding to the UIBC command reaches the calculated time.

The controller 503 may notify the sink device 150 of whether to transmit the multimedia contents by using the information about the play position of the multimedia contents. That is, the controller 503 notifies the sink device 150 of at least one of the play position of the multimedia contents (that is, a point in time) in the buffer, a PES number, memory size information, time information, and information about the amount of contents stored in the buffer of the sink device 150, as the information about the play position of the multimedia contents, in operation 607.

Figure 7:
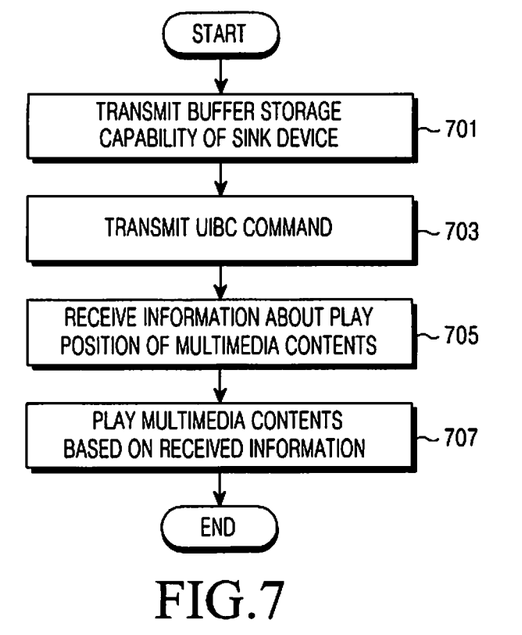
FIG. 7 is a flowchart illustrating a method for playing multimedia contents in a sink device 150 of a communication system according to an embodiment of the present disclosure.

FIG. 7 is a flowchart illustrating a method for playing multimedia contents in a sink device of a communication system according to an embodiment of the present disclosure.

Referring to FIG. 7, the controller 553 transmits a buffer storage capability of the sink device 150 through the communication unit 557 in operation 701. Upon receiving the UIBC command from the user through the input unit 559, the controller 553 transmits the UIBC command received through the communication unit 557 to the source device 100 in operation 703. The controller 553 receives information about the play position of the multimedia contents from the source device 100 in operation 705. The information about the play position of the multimedia contents includes at least one of a play position (that is, a point in time) of the multimedia contents in the buffer, a PES number, memory size information, time information, and information about the amount of contents stored in the buffer of the sink device 150. The controller 553 plays the multimedia contents based on the received information about the play position of the multimedia contents in operation 707. For example, the controller 553 plays the multimedia contents stored in the buffer, if the PES number included in the information about the play position of the multimedia contents is 1. As another example, if the PES included in the information about the play position of the multimedia contents is 3, the controller 553 receives multimedia contents corresponding to the PES numbers of 1 and 2 from the source device 100 and plays them, and then plays multimedia contents stored in the buffer for the multimedia contents corresponding to the PES number of 3.

Thus, the sink device 150 may effectively play the multimedia contents by using the information about the play position of the multimedia contents delivered from the source device 100.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for playing multimedia content in a first device of a communication system, the method comprising:
    establishing, by a controller of the first device, a Wi-Fi display session between the first device and a second device;
    establishing, by the controller, a user interface back channel between the first device and the second device within the Wi-Fi display session;
    receiving, by a communication interface of the first device, a buffer storage capability of the second device from the second device;
    receiving, by the communication interface, a control command indicating a play time position requested by a user from the second device through the user interface back channel;
    calculating, by the controller, a data size of the multimedia content between the play time position requested by the user and a current play time position of the multimedia content, wherein the play time position requested by the user precedes the current play time position;
    if the buffer storage capability of the second device is greater than the calculated data size, transmitting, by the communication interface, to the second device, first information comprising information indicating that data of the multimedia content between the play time position requested by the user and the current play time position, is not transmitted; and
    if the buffer storage capability of the second device is not greater than the calculated data size, transmitting, by the communication interface, to the second device, second information comprising information indicating that data of the multimedia content between the play time position requested by the user and a third play time position, is transmitted,
    wherein the third play time position is between the play time position requested by the user and the current play time position and determined based on a difference between the buffer storage capability and the calculated data size, and
    wherein the first information further comprises at least one of location information of the multimedia content in a buffer of the second device, a packetized elementary stream (PES) number, memory size information, time information, and information about an amount of data previously stored in the buffer of the second device.

2. The method of claim 1, wherein if the buffer storage capability of the second device is greater than the calculated data size, the multimedia content between the play time position requested by the user and the current play time position is played by the second device based on data stored in the buffer of the second device.

3. The method of claim 1, wherein the first information is transmitted to the second device through a real-time streaming protocol (RTSP).

4. A method for playing multimedia content in a second device of a communication system, the method comprising:
    establishing, by a controller of the second device, a Wi-Fi display session between a first device and the second device;
    establishing, by the controller, a user interface back channel between the first device and the second device within the Wi-Fi display session;
    transmitting, by a communication interface of the second device, a buffer storage capability of the second device to the first device;
    transmitting, by the communication interface, a control command indicating a play time position requested by a user to the first device through the user interface back channel;
    receiving, by the communication interface, from the first device, first information comprising information indicating that data of the multimedia content between the play time position requested by the user and a current play time position of the multimedia content is not transmitted, if the buffer storage capability of the second device is greater than a data size of the multimedia content between the play time position requested by the user and the current play time position, wherein the play time position requested by the user precedes the current play time position;
    in response to receiving the first information, playing, by the controller, the multimedia content between the play time position requested by the user and the current play time position based on data stored in a buffer of the second device; and if the buffer storage capability of the second device is not greater than the data size, receiving, by the communication interface, from the first device, second information comprising information indicating that data of the multimedia content between the play time position requested by the user and a third play time position is transmitted,
    wherein the third play time position is between the play time position requested by the user and the current play time position and determined based on a difference between the buffer storage capability and the data size, and
    wherein the first information further comprises at least one of location information of the multimedia content in the buffer of the second device, a packetized elementary stream (PES) number, memory size information, time information, and information about an amount of data previously stored in the buffer of the second device.

5. The method of claim 4, wherein the first information is transmitted to the second device through a real-time streaming protocol (RTSP).

6. An apparatus for playing multimedia content in a first device of a communication system, the apparatus comprising:
a communication interface configured to:
receive a buffer storage capability of a second device from the second device, and
receive a control command indicating a play position requested by a user from the second device through a user interface back channel; and a controller configured to:
establish a Wi-Fi display session between the first device and the second device;
establish the user interface back channel between the first device and the second device within the Wi-Fi display session;
calculate a data size of the multimedia content between the play position requested by the user and a current play time position of the multimedia content,
wherein the play time position requested by the user precedes the current play time position;
if the buffer storage capability of the second device is greater than the calculated data size, control the communication interface to transmit, to the second device, first information comprising information indicating that data of the multimedia content between the play time position requested by the user and the current play time position, is not transmitted; and
if the buffer storage capability of the second device is not greater than the calculated data size, control the communication interface to transmit, to the second device, second information comprising information indicating that data of the multimedia content between the play position requested by the user and a third play time position is transmitted,
wherein the third play time position is between the play time position requested by the user and the current play time position and determined based on a difference between the buffer storage capability and the calculated data size, and
wherein the first information further comprises at least one of location information of the multimedia content in a buffer of the second device, a packetized elementary stream (PES) number, memory size information, time information, and information about an amount of data previously stored in the buffer of the second device.

7. The apparatus of claim 6, wherein if the buffer storage capability of the second device is greater than the calculated data size, the multimedia content between the play time position requested by the user and the current play time position is played by the second device based on data stored in the buffer of the second device.

8. The apparatus of claim 6, wherein the first information is transmitted to the second device through a real-time streaming protocol (RTSP).

9. An apparatus for playing multimedia content in a second device of a communication system, the apparatus comprising:
a controller configured to:
establish a Wi-Fi display session between a first device and the second device;
establish a user interface back channel between the first device and the second device within the Wi-Fi display session; and
a communication interface configured to:
transmit a buffer storage capability of the second device to the first device, transmit a control command indicating a play position requested by a user to the first device through the user interface back channel,
receive, from the first device, first information comprising information indicating that data of the multimedia content between the play time position requested by the user and a current play time position of the multimedia content is not transmitted, if the buffer storage capability of the second device is greater than a data size of the multimedia content between the play time position requested by the user and the current play time position, wherein the play time position requested by the user precedes the current play time position, and
if the buffer storage capability of the second device is not greater than the data size, receive, from the first device, second information comprising information indicating that data of the multimedia content between the play time position requested by the user and a third play time position is transmitted,
wherein the third play time position is between the play time position requested by the user and the current play time position and determined based on a difference between the buffer storage capability and the data size,
wherein the controller is further configured to play the multimedia content between the play time position requested by the user and the current play time position based on data stored in a buffer of the second device, in response to receiving the first information, and
wherein the first information further comprises at least one of location information of the multimedia content in the buffer of the second device, a packetized elementary stream (PES) number, memory size information, time information, and information about an amount of data previously stored in the buffer of the second device.

10. The apparatus of claim 9, wherein the first information is transmitted to the second device through a real-time streaming protocol (RTSP).

* * * * *